United States Patent Office 2,768,073
Patented Oct. 23, 1956

2,768,073
EXPLOSIVE COMPOSITIONS

Duncan Davidson, Fairlie, Scotland, assignor to Imperial Chemical Industries Limited, a corporation of Great Britain No Drawing. Application February 26, 1953,
Serial No. 339,169

Claims priority, application Great Britain April 21, 1952

5 Claims. (Cl. 52—11)

This invention relates to improvements in or relating to blasting explosive compositions containing water-soluble inorganic oxygen supplying salts.

Explosive compositions containing water-soluble inorganic oxygen supplying salts such as nitrates and perchlorates of calcium, magnesium, potassium, sodium and ammonium have been widely used for many years. Those containing ammonium nitrate are the most important since ammonium nitrate is not only an oxygen supplying salt but is also an explosive salt. Ammonium nitrate thus forms the principal power producing ingredient of a great many explosive compositions at present manufactured. The use of these compositions is restricted by the water solubility and in some instances, as for example ammonium nitrate, by the hygroscopicity of these salts.

Gelatine explosives have the necessary degree of water resistance because of their high content of nitroglycerine and nitrocellulose, but the tendency for the cost of nitroglycerine to increase often makes it desirable to replace gelatine explosives as far as possible by semi-gelatine and powder explosives and to improve the water resisting properties of semi-gelatine and powder explosives sufficiently for them to approximate to gelatines it has already been suggested to include a number of water-soluble gel forming materials. In this connection manno-gelactans such as locust bean gum and carob bean gum and water swellable and soluble ethers of macro-molecular polysaccharides such as sodium cellulose glycollate or methyl cellulose and similar starch derivatives have been included. It has also been proposed in this connection to coat the water-soluble salts with water repellent materials such as paraffin, petroleum and rosin.

By the term "semi-gelatine explosive" as used herein is meant a blasting explosive composition which includes nitrocellulose and a quantity of liquid solvent therefor in insufficient amount to permit the composition to be extruded as a continuous cord from a screw-extrusion machine.

By the term "powder explosive" as used herein is meant a blasting explosive composition in the form of powder or granules and free from nitrocellulose.

According to the present invention semi-gelatine and powder explosive compositions contain at least one water-soluble inorganic oxygen supplying salt and a xylo-galactan.

Powdered xylo-galactans have the property of rapidly forming a gel on being mixed with water. The presence of salts dissolved in the water does not appear materially to affect this property and the xylo-galactan gels are not affected by the salts. When an explosive composition containing a water-soluble salt and a xylo-galactan comes into contact with water the xylo-galactan absorbs water and the resulting gel protects the water-soluble salts and inhibits leaching and desensitisation.

A suitable xylo-galactan is in the mucilage of commercial psyllium seed. Commercial psyllium seed includes the seeds of *Plantago arenaria*, *P. lanceolata*, *P. ovata* Forskall, *P. Leoflingii*, and *P. psyllium*. Mucilage from seeds of *P. psyllium* is preferred as this gives superior results. The mucilage is preferably obtained by cold water extraction of the seeds since in some cases the mucilage obtained by hot water extraction has been found not to confer such good waterproof properties on the explosive composition.

The inclusion of xylo-galactans enables semi-gelatine and powder explosives containing a water-soluble salt to be used in wet situations where it has hitherto been customary to use the more expensive gelatine explosives.

The superior properties of xylo-galactans enable less of them to be used than of other substances such as manno-galactans and polysaccharide ethers to obtain the same degree of water resistance. On the other hand if greater water resistance is desired an appropriate quantity should be used. Amounts as small as 0.10% by weight are effective in improving the water resistant properties of explosive compositions containing water soluble salts but amounts as high as 5% can also be used.

Explosive compositions usually contain carbonaceous combustible ingredients. Xylo-galactans, in addition to providing good water resisting properties are also an excellent source of carbonaceous combustible material and consequently may be employed in substitution for part or all of the carbonaceous combustible material usually employed in explosives.

The xylo-galactans used should be finely ground, for example, to pass a No. 60 B. S. sieve and preferably to pass a No. 120 B. S. sieve before incorporation in the explosive composition. If the composition is also to contain any liquid ingredient, for example, nitroglycerine the xylo-galactan and the solid ingredients should preferably be thoroughly mixed prior to the incorporation thereof.

Xylo-galactans may be employed widely in the preparation of explosive compositions containing water soluble salts. They have, however, been found particularly advantageous in compositions sensitised with trinitrotoluol or explosive nitric esters such as nitroglycerine and the various nitroglycerine mixtures commonly employed in the explosive industry. Normally the invention will find its principal application in explosive compositions containing higher proportions of water soluble salts, as high as, for example, about 90%. However, the invention can be applied to the improvement of explosives containing relatively small amounts, for example, of the order of 15% of water soluble salts.

Explosive compositions made in accordance with the invention may contain any of the ingredients commonly used to obtain special effects, for example, sensitisers and cooling salts. In addition water resistant coating compositions such as calcium stearate may be used although such coatings are unnecessary.

The following Tables 1 and 2 show the water resistance of a number of explosive compositions some of which contain psyllium seed mucilage and some of which contain other ingredients to improve the water resistance. The water resistance is measured as the maximum length of time after which a cartridge of length 4" and diameter 1¼" will still fire satisfactorily using a No. 6 commercial mercury fulminate detonator after storage under 6" of water, the cartridge after wrapping having been dipped in wax and having had 3 holes of ¼" diameter and ½" depth made in it. In addition while under water it has a dummy detonator inserted for 1 inch at one end. Those compositions which contain nitrocellulose are semi-gelatine explosives and those free from nitrocellulose are powder explosives.

Table 1

| | | | | | | | | | | | | | | | | | | | |
|---|---|---|---|---|---|---|---|---|---|---|---|---|---|---|---|---|---|---|---|
| Nitrated mixture of glycerol and ethylene glycol in ratio 4:1 by weight | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 |
| Nitrocellulose | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 0.25 | 4.0 | 4.0 |
| Waxed woodmeal | 4.0 | 4.0 | 4.0 | 4.0 | 4.0 | 4.0 | 3.0 | 2.0 | 2.0 | 2.0 | 2.0 | 2.0 | 2.0 | 2.0 | 2.0 | 2.0 | 2.0 | 4.0 | 4.0 |
| Woodflour | 1.5 | 1.0 | 0.75 | 1.0 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Ammonium nitrate | 79.25 | 79.25 | 79.25 | 79.25 | 79.25 | 78.75 | 78.75 | 78.25 | 78.25 | 78.25 | 78.25 | 78.25 | 78.25 | 78.25 | 78.25 | 78.25 | 78.25 | 78.75 | 78.75 |
| Psyllium seed mucilage | | 0.25 | 0.25 | 0.5 | 0.5 | 1.0 | 2.0 | 4.0 | | | | | | | | | | | |
| Sodium carboxymethyl cellulose | | | | | | | | | 4.0 | | | | | | | | | | 1.0 |
| Guar gum | | | | | | | | | | 4.0 | | | | | | | | | |
| Locust bean gum | | | | | | | | | | | 4.0 | | | | | | | | |
| Dextrin | | | | | | | | | | | | 4.0 | | | | | | | |
| British gum | | | | | | | | | | | | | 4.0 | | | | | | |
| Indian gum | | | | | | | | | | | | | | 4.0 | | | | | |
| Ghatti gum | | | | | | | | | | | | | | | 4.0 | | | | |
| Cherry gum | | | | | | | | | | | | | | | | | | 1.0 | |
| Sodium alginate | | | | | | | | | | | | | | | | | | 0.5 | 0.5 |
| Calcium stearate | | 0.25 | 0.50 | | 0.5 | 0.5 | 0.5 | | | | | | | | | | | | |
| Waterproof test (hrs.) | 6 | 22 | >55 | >196 | >168 | >280 | >254 | >336 | 96 | 48 | 48 | 1 | 4 | 96 | 4 | 8 | 24 | 56 | |

Table 2

| | | | | | | | | | | | | | |
|---|---|---|---|---|---|---|---|---|---|---|---|---|---|
| Nitrated mixture of glycerol and ethylene glycol in ratio 4:1 by weight | 17.0 | 17.0 | 12.0 | 12.0 | 10.5 | 10.5 | | | | | | | |
| Mononitrotoluene | 1.5 | 1.5 | | | | | | | | | | | |
| Nitrocellulose | | | 0.25 | 0.25 | | | | | | | | | |
| Nitrocellulose (water wet) | 0.7 | 0.7 | | | | | | | | | | | |
| Woodmeal | | | 6.25 | 6.25 | 5.0 | 5.0 | | | | | | | |
| Woodflour | | | | | 2.62 | 2.62 | | | | | | | |
| Waxed woodmeal | | | | | 0.5 | 0.5 | | | | | | | |
| Starch | 6.5 | 6.5 | | | | | | | | | | | |
| Ammonium nitrate | 50.5 | 50.5 | | | 61.63 | 61.63 | 83.0 | 82.0 | 80.5 | 80.5 | 80.5 | 80.5 | 80.5 |
| Sodium nitrate | 5.0 | 5.0 | 51.5 | 51.5 | | | | | | | | | |
| Sodium chloride | 15.3 | 15.3 | | | 18.25 | 18.25 | | | | | | | |
| Ammonium chloride | | | 28.0 | 28.0 | | | | | | | | | |
| China clay | 2.5 | 2.5 | | | | | | | | | | | |
| Trinitrotoluene | | | | | | | 12.0 | 12.0 | 12.0 | 12.0 | 12.0 | 12.0 | 12.0 |
| Aluminium (granular) | | | | | | | 4.0 | 4.0 | 4.0 | 4.0 | 4.0 | 4.0 | 4.0 |
| Aluminium (paint fine) | | | | | | | 1.0 | 1.0 | 1.0 | 1.0 | 1.0 | 1.0 | 1.0 |
| Psyllium seed mucilage | 1.0 | | 2.0 | | 1.0 | | 0.5 | 0.5 | 2.0 | | | | |
| Sodium carboxy-methyl cellulose | | 1.0 | | 2.0 | | 1.0 | | | | 2.0 | | | |
| Guar gum | | | | | | | | | | | 2.0 | | |
| Indian gum | | | | | | | | | | | | | 2.0 |
| Cherry gum | | | | | | | | | | | | 2.0 | |
| Calcium stearate | | | | | 0.5 | 0.5 | | 0.5 | | 0.5 | | 0.5 | 0.5 |
| Waterproof test (hrs.) | >408 | 48 | 168 | 8 | >240 | 8 | <½ | 48 | >240 | 24 | 64 | <24 | <5 |

The waterproofing agents in the compositions shown in the tables are all of a particle size less than 120 B. S. S. mesh.

What I claim is:

1. Semi-gelatine and powder explosive compositions containing at least one water-soluble inorganic oxygen supplying salt selected from the group consisting of nitrates and perchlorates of calcium, magnesium, potassium, sodium, and ammonium and a xylo-galactan obtained from the mucilage of commercial psyllium seed, said xylo-galactan being in amount of from about 0.5% to about 5% by weight.

2. Semi-gelatine and powder explosive compositions as claimed in claim 1 wherein the commercial psyllium seed is P. psyllium.

3. Semi-gelatine and powder explosive compositions as claimed in claim 1 wherein the xylo-galactans are ground to pass a No. 60 B. S. sieve.

4. Semi-gelatine and powder explosive compositions as claimed in claim 3 wherein the finely ground xylo-galactans pass a No. 120 B. S. sieve.

5. Semi-gelatine and powder explosive compositions as claimed in claim 1 wherein the water-soluble inorganic oxygen supplying salt is ammonium nitrate.

References Cited in the file of this patent

UNITED STATES PATENTS 2,654,666  Taylor _____ Oct. 6, 1953

FOREIGN PATENTS 645,039  Great Britain _____ Oct. 27, 1950

OTHER REFERENCES

Mantell: "Water-Soluble Gums," pub. 1947, by Reinhold Pub. Corp., 330 West Forty-Second St., New York 18, N. Y., pages 131–136. (Copy in Scientific Library.)